United States Patent [19]

Allen

[11] Patent Number: 4,969,371
[45] Date of Patent: Nov. 13, 1990

[54] GEAR TYPE FLEXIBLE COUPLING

[75] Inventor: Edward E. Allen, North East, Pa.

[73] Assignee: Renold, Inc., Westfield, N.Y.

[21] Appl. No.: 301,840

[22] Filed: Jan. 26, 1989

[51] Int. Cl.⁵ .............................................. F16D 3/18
[52] U.S. Cl. ................................... 74/462; 464/154; 464/157; 464/158
[58] Field of Search .................. 74/462; 464/154, 157, 464/158

[56] References Cited

U.S. PATENT DOCUMENTS

| | | | |
|---|---|---|---|
| 1,891,285 | 12/1932 | Loewus | 464/154 |
| 2,035,171 | 3/1936 | Loewus | 464/158 |
| 2,035,434 | 3/1936 | Loewus | 74/462 |
| 2,315,068 | 3/1943 | Matthews | 74/462 |
| 2,682,760 | 7/1954 | Shenk | 464/158 |
| 2,922,294 | 1/1960 | Wildhaber | 74/462 |
| 3,247,736 | 4/1966 | Roth | 74/462 |
| 3,292,390 | 12/1966 | Wildhaber | 74/462 |

FOREIGN PATENT DOCUMENTS

| | | | |
|---|---|---|---|
| 62-251562 | 11/1987 | Japan | 74/462 |
| 813029 | 3/1981 | U.S.S.R. | 74/462 |
| 929914 | 5/1982 | U.S.S.R. | 74/462 |

*Primary Examiner*—Leslie A. Braun
*Assistant Examiner*—Scott Anchell
*Attorney, Agent, or Firm*—Charles L. Lovercheck; Wayne L. Lovercheck; Dale Lovercheck

[57] ABSTRACT

A hob or shaper cutter for making a hub for a misalignment gear coupling having a hub and a sleeve. The hob or shaper cutter has cutting edges. Each cutting edge being inclined at a different angle to the center line of the tooth. The cutting edges are adapted to cut tooth flank surfaces having three adjacent involute shaped areas. Each involute shaped area having a different pressure angle than the involute area adjacent it. The involute areas of each tooth result in teeth with flanks that are generally cylindrical shaped, whereby hub treeth operate with a minimum of interferfence with sleeve teeth when operating with the hub misaligned with the sleeve.

3 Claims, 5 Drawing Sheets

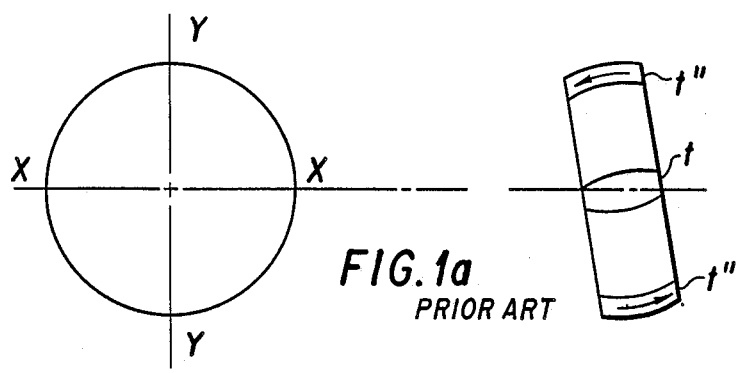
FIG. 1a PRIOR ART
FIG. 1b PRIOR ART
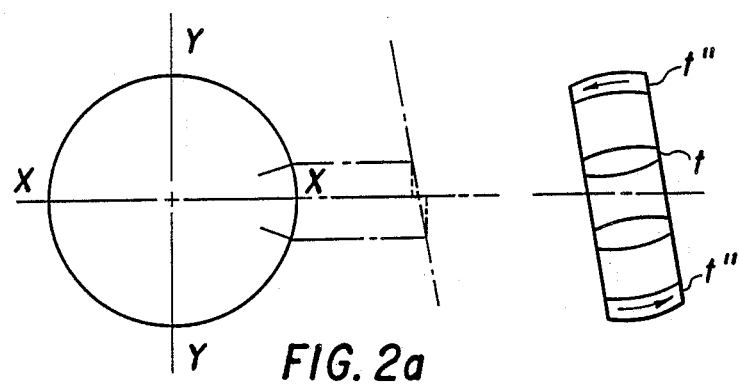
FIG. 2a PRIOR ART
FIG. 2b PRIOR ART
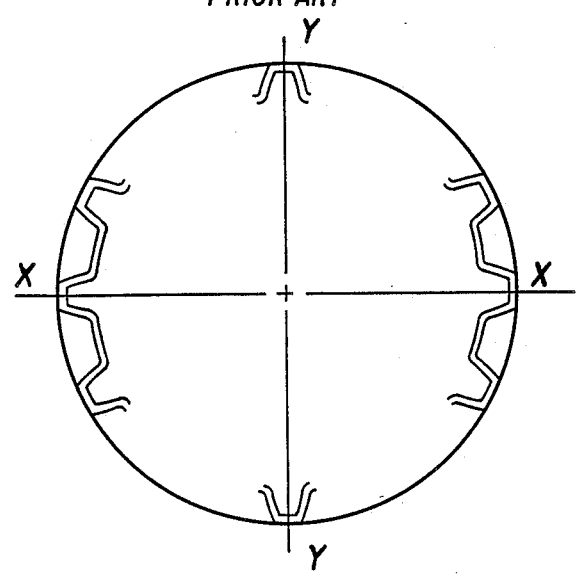
FIG. 3 PRIOR ART

GEAR TYPE FLEXIBLE COUPLING

BACKGROUND OF THE INVENTION

This invention relates to a gear type coupling and deals particularly with reducing or eliminating the mismatch that occurs between the internal and external involute profile during misalignment.

REFERENCE TO PRIOR ART

The coupling disclosed herein constitutes an improvement over the "gear couplings" shown in the following patents:
U.S. Pat. No. 1,891,285 to Loewus
U.S. Pat. No. 2,035,171 to Loewus
U.S. Pat. No. 2,035,434 to Loewus
U.S. Pat. No. 2,315,068 to Matthews
U.S. Pat. No. 2,682,760 to Shenk

OBJECTS OF INVENTION

The general object of the invention is to provide maximum surface contact between mating teeth, when misaligned, in order to reduce surface stress thereby prolonging gear life.

Another object of the invention is to provide maximum surface contact between mating teeth, when misaligned, to minimize heat generation, and prolonging gear life.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1a is a diagrammatic view indicating the X—X plane and Y—Y plane passing through the coupling, shown in FIG. 1b according to the prior art.

FIG. 1b is a diagrammatic side view of a crown tooth of a hub of a coupling indicating the tooth action that takes place at different points around the coupling according to the prior art.

FIG. 2a is a diagrammatic view similar to FIG. 1a of a hub of a coupling, showing the two planes of msialignment and relative tooth position according to the prior art.

FIG. 2b is a diagrammatic view similar to FIG. 1b of a hub of a coupling indicating combined sliding and rolling contact at the tooth surfaces according to the prior art.

FIG. 3 is a view of a coupling hub in a sleeve, showing the relationship of the hub teeth to the sleeve teeth according to the prior art; the coupling operating at several positions of misalignment.

DETAILED DESCRIPTION OF THE DRAWINGS

Referring to FIG. 1, when a gear coupling accommodates misalignment between two shafts connected by a gear coupling, rolling motion occurs, between the teeth t in the plane X—X of misalignment on teeth t. Sliding occurs in the plane Y—Y perpendicular to the plane of misalignment, as indicated in FIG. 1. Action between the two planes X—X and Y—Y is a combination of rollig and sliding on teeth t as indicated in FIG. 2 which shows the x—x and 7—y axis and the central region of the tooth where maximum mismatch of teeth occurs, indicated at x' and a side view of the coupling hub at b.

In order for a gear coupling to transmit torque a given number of teeth must share the load, the number being a function of torque and degree of misalignment. The higher the degree of misalignment the fewer number of load carrying teeth. Conversely, the lower the angle the higher the number of load carrying teeth.

Referring to FIG. 3 and tracking a pair of rotating mating teeth through one revolution they go from pure sliding zero contact to combined rolling and sliding to pure rolling to sliding and rolling and back to zero contact twice in each revolution.

Figure 4A:
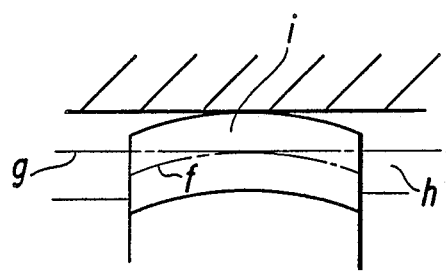
FIGS. 4a and 4b show the relationship of barreled crowned external teeth aligned and crown teeth misaligned respectively according to the prior art.
Figure 4B:
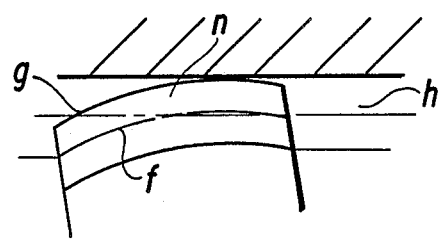
Figure 4C:
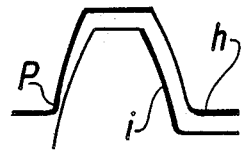
FIG. 4c is an enlarged partial end view of a hub tooth and a sleeve tooth showing the point of line contact of the teeth resulting from misalignment according to the prior art.
Figure 5C:
FIGS. 5a, b, c, d, e and f show the relationship of crown shaped hub teeth having a straight external and internal pitch line matching the straight pitch line of an internal tooth in the pure rolling plane only, according to the prior art showing that in all other planes a mismatch will occur due to foreshortening of rolling and sliding again resulting in point of line contact.
Figure 5A:
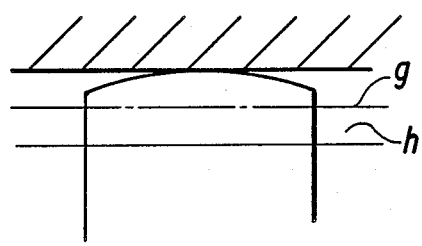
Figure 5D:
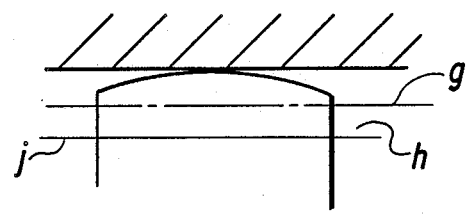
Figure 5B:
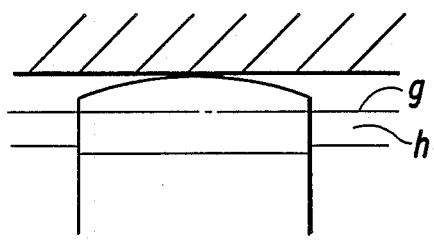
Figure 5E:
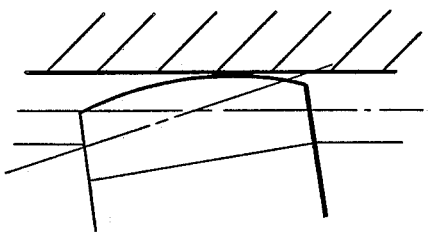
Figure 5F:
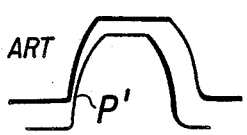

Referring to FIGS. 4a, 4b and 4c on a barreled crown hub the external teeth have a curved pitch line f which mismatches with the straight pitch line g of an internal tooth h in all planes of misalignment resulting in point or line of contact as indicated in FIG. 4c.

Referring to FIG. 5, barreled shaped external teeth have a straight pitch line h matching the straight pitch line h of an internal tooth in the pure rolling plane only. In all other planes a mismatch will occur due to foreshortening of rolling and sliding again resulting in point or line of contact p in FIG. 5f.

Referring to FIG. 6, by varying the involute to produce a cylinder, line or point contact can be eliminated under load by deflection to produce an area contact in all planes.

Figure 6A:
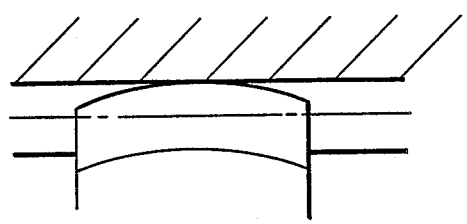
FIG. 6a shows a crowned hobbed tooth, according to the prior art that is aligned.
Figure 6B:
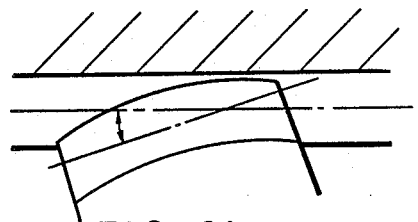
FIG. 6b shows a crowned hobbed hub tooth, according to the prior art misaligned with its sleeve tooth.
Figure 6C:
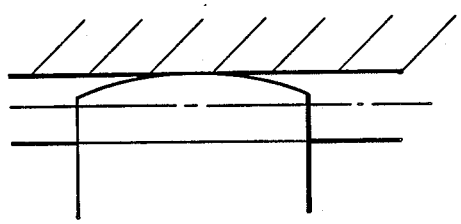
FIG. 6c shows a crowned shaped hub tooth, according to the prior art aligned with its sleeve tooth.
Figure 6D:
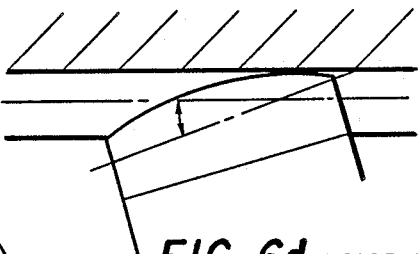
FIG. 6d shows a crowned shaped hub tooth, according to the prior art misaligned in the plane of combined rolling and sliding.
Figure 6E:
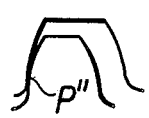
FIG. 6e shows the relationship of hub and sleeve teeth having barreling or alteration of the involute, according to the prior art to obtain cylindrical contact according to the invention with either crowned or straight pitch lines.

FIG. 6a shows a crown hobbed tooth aligned. FIG. 6b shows a crown hobbed tooth misaligned showing involute mismatch. FIG. 6c shows a crown shaped tooth aligned. FIG. 6d shows a crown shaped tooth misaligned in the plane of combined rolling and sliding. FIG. 6e shows barreling or alteration of the involute to obtain cylindrical contact with either crowned or straight pitch lines to eliminate point or line contact.

Figure 7A:
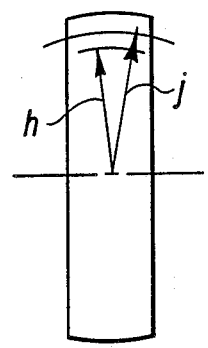
FIG. 7a is a diagrammatic central cross sectional view through a crowned tooth, according to the prior art showing a crowned tooth having a different radius of root crown and flank.

FIG. 7(a) shows a tooth with the radius h of the curved root line and the radius j of the pitch line of a crowned tooth hub according to the prior art.

Figure 7B:
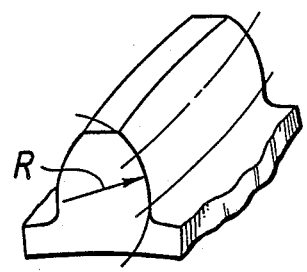
FIG. 7b shows a crowned shaped tooth crowned with pitch line and straight root line and flank curved around a raduis R.
Figure 7C:
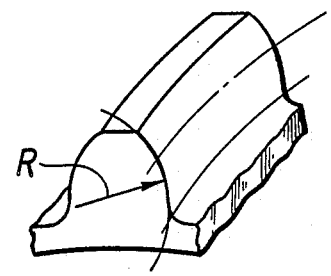
FIG. 7c shows a crowned tooth with a pitch line curved on a cylindrical surface having a radius R and curved root line.

FIG. 7c shows a tooth similar to FIG. 7b with crowned root surface.

Figure 8:
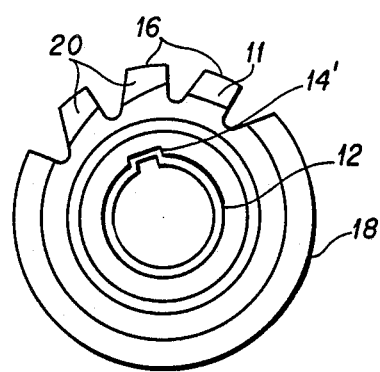
FIG. 8 is an end view of a hob, according to the prior art of a type well known to those skilled in the art.
Figure 9:
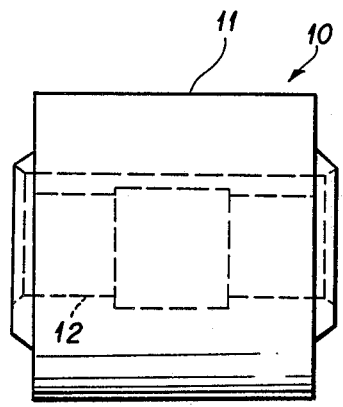
FIG. 9 is a side view of the hob, according to the prior art shown in FIG. 8.
Figure 11:
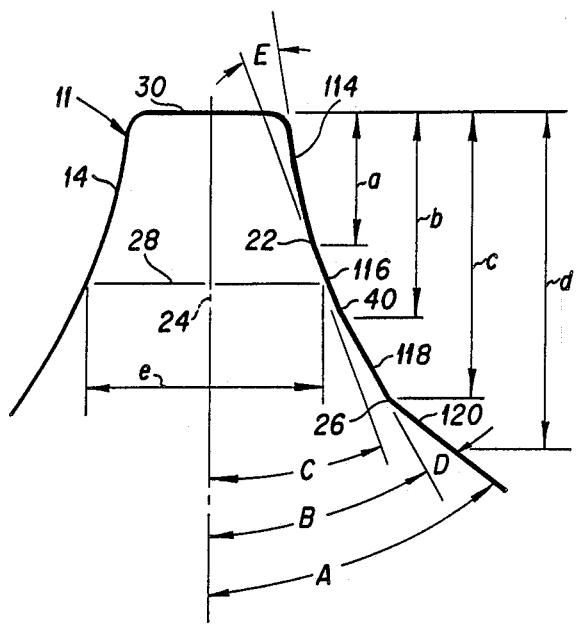
FIG. 11 is an enlarged end view of a single tooth of a hob according to the invention.

The present invention uses a conventional hob like the hob shown in FIGS. 8 and 9 with teeth modified according to FIG. 11. Hob 10 has a cylindrical body of suitable length and diameter. The cylindrical body has central bore 12 therethrough with keyway 14 formed in bore 12 for drive purpose. The cylindrical body has teeth 11 cut in its outer periphery 18.

Figure 10:
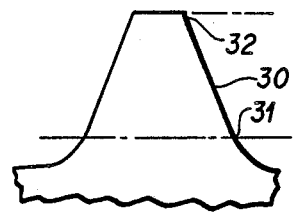
FIG. 10 is an end view of a single tooth of a hob for making an ordinary involute flank on a gear tooth, according to the prior art.

FIG. 10 shows an enlarged view of a tooth of a single, right-hand thread ground hob taken from "Gear Cutting Practice" by Colvin and Stanley, 1937, 1943, the McGraw-Hill Book Company, page 142, FIG. 78.

The hob tooth of FIG. 10, according to the prior art has straight flank portion 30 extending from root 31 to tip 32. Applicant's external teeth are made by a hob having teeth like the hob shown in FIG. 11. The flank portion of applicant's hob teeth, shown in FIG. 11, are made of several involute sections, each having a different pressure angle. This results in a tooth having a flank with surface increments that are generally tangent to a cylinder. First involute surface 14 joins second involute surface 16 at 22. Second involute surface 16 joins third involute surface 18 at 40. Lower part 20 joins third involute surface 18 at 26. Involute surfaces 14, 16 and 18 may be blended together by a lapping operation or the like.

Figure 12:
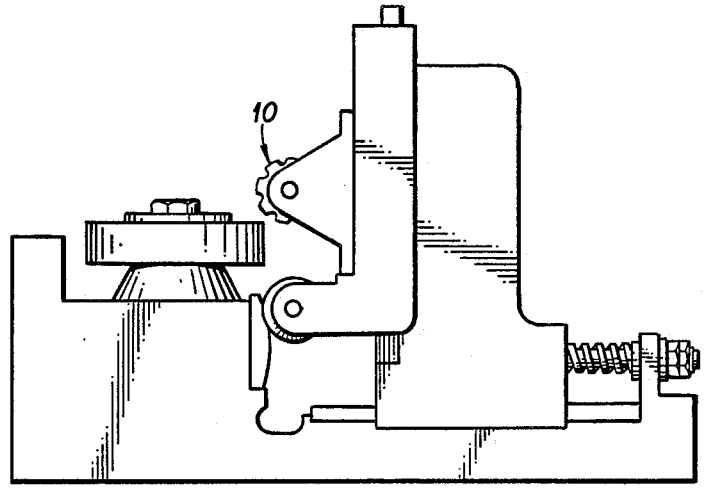
FIG. 12 is an end view of a prior art type hobbing machine, which may be equipped with a hob, made according to FIG. 11.

In a typical example in FIGS. 8, 11 and 12, the tooth dimension are:
 a equals 0.5785 inches
 b equals 0.6960 inches
 c equals 0.9785 inches
 d equals 1.150 inches
 e equals 0.7854 inches
Involute angles may be:
 E−2°30′

Tooth on hubs cut with a hob or shaper cutter + made similar to the example shown will cut teeth having flanks with a substantially cylindrical shape and will reduce interference between the hub teeth and sleeve teeth in couplings operating in conditions of misalignment.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A gear for a flexible gear coupling,
said gear having a plurality of external teeth,
each of said teeth having a top, a root and a flank,
each said flank comprising a first involute surface adjacent said top, a third involute surface adjacent said root and a second involute surface between said first involute surface and said third involute surface,
said involute surfaces each having a different pressure angle from the other and conforming generally to a part of cylindrical surface.

2. The gear recited in claim 1 wherein said pressure angles differ from one another by approximately two and one half degrees.

3. The gear recited in claim 2 wherein said involute surfaces are blended together.

* * * * *